(12) United States Patent
Kajimoto et al.

(10) Patent No.: US 7,639,239 B2
(45) Date of Patent: Dec. 29, 2009

(54) CONTROL INPUT DEVICE WITH VIBRATING FUNCTION

(75) Inventors: Tomomi Kajimoto, Iwaki (JP); Yasuharu Tsunokake, Iwaki (JP); Satoshi Ishida, Iwaki (JP)

(73) Assignee: Alpine Electronics, Inc., Fukushima (JP)

( * ) Notice: Subject to any disclaimer, the term of this patent is extended or adjusted under 35 U.S.C. 154(b) by 694 days.

(21) Appl. No.: 11/291,084

(22) Filed: Nov. 30, 2005

(65) Prior Publication Data

US 2006/0146032 A1   Jul. 6, 2006

(30) Foreign Application Priority Data

Dec. 1, 2004   (JP)   ............... 2004-348071

(51) Int. Cl.
   *G06F 3/041*   (2006.01)
(52) U.S. Cl. .................................. 345/173
(58) Field of Classification Search ............ 345/173; 715/701, 702
   See application file for complete search history.

(56) References Cited

U.S. PATENT DOCUMENTS

| | | | |
|---|---|---|---|
| 5,537,158 A * | 7/1996 | Yano et al. ............... 725/37 |
| 6,429,846 B2 | 8/2002 | Rosenberg et al. |
| 7,205,978 B2 * | 4/2007 | Poupyrev et al. ............ 345/157 |
| 7,336,266 B2 * | 2/2008 | Hayward et al. ............ 345/179 |
| 2003/0231170 A1 * | 12/2003 | Yoshikawa et al. .......... 345/173 |
| 2005/0239429 A1 * | 10/2005 | Inoue ........................ 455/297 |
| 2006/0152497 A1 * | 7/2006 | Rekimoto .................... 345/173 |

* cited by examiner

*Primary Examiner*—Alexander Eisen
*Assistant Examiner*—Robin Mishler
(74) *Attorney, Agent, or Firm*—Brinks Hofer Gilson & Lione

(57) ABSTRACT

A vibration-function-equipped control input system includes: a display panel capable of displaying a control screen; a touch panel; a pressure-position detector; a vibration section that generates vibration to apply to the touch panel; and a controller operatively connected to the display panel, the touch panel, the pressure-position detector, and the vibration section. The controller directs the vibration section to generate a vibration of a first vibration pattern when a predetermined time has passed after the part of the touch panel corresponding to the position of a control key displayed on the control screen is pushed, and subsequently directs the vibration section to generate a vibration of a second vibration pattern when a change of a control object controlled by the control key is detected after the predetermined time has passed.

20 Claims, 13 Drawing Sheets

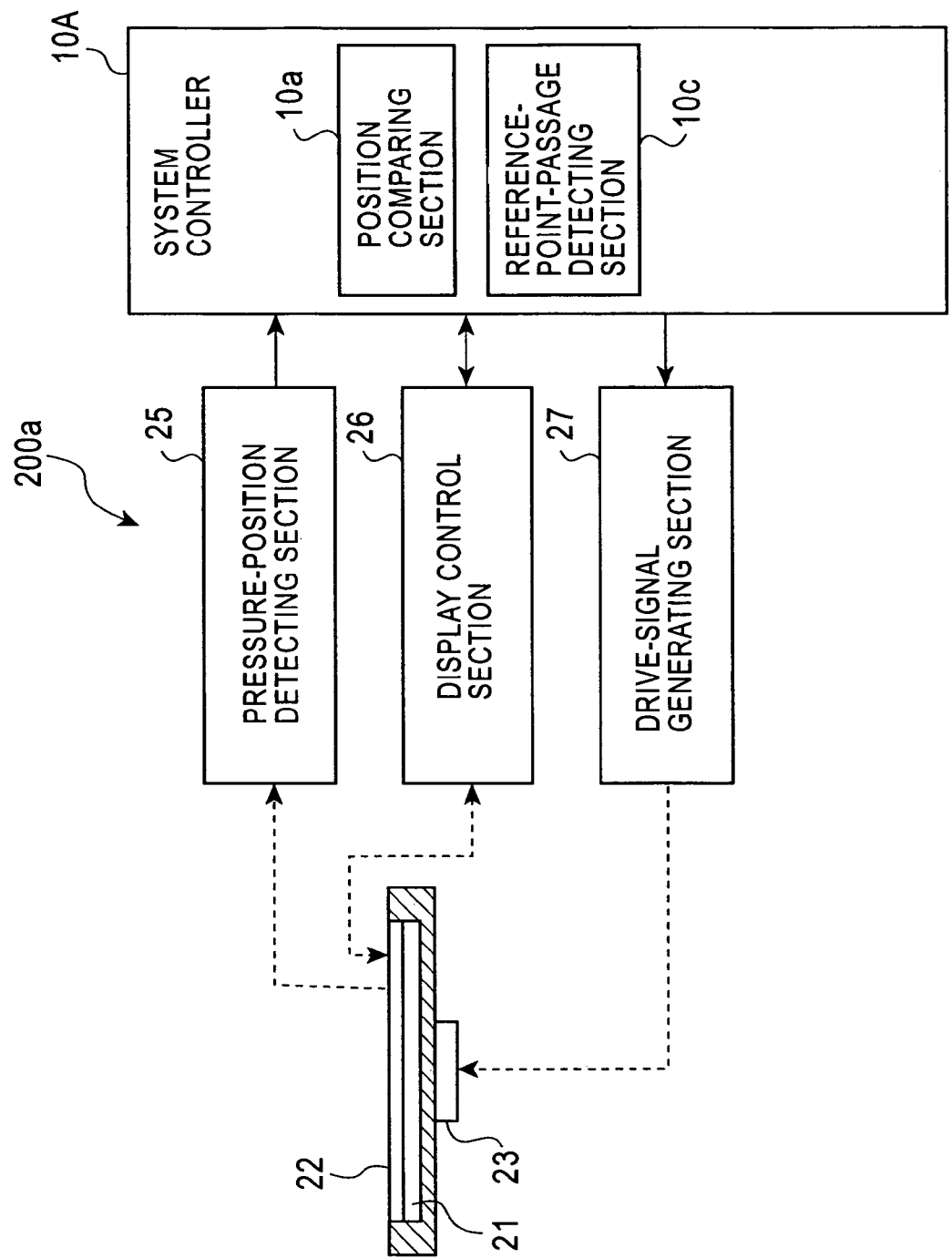

CONTROL INPUT DEVICE WITH VIBRATING FUNCTION

BACKGROUND OF THE INVENTION

1. Field of the Invention

The present invention relates to a control input device, and in particular, it relates to a control input device having the function of generating vibration in response to the operation of an operator.

2. Description of the Related Art

Intuitive touch panels have recently been used as input devices for car-mounted navigation systems. In this type of car-mounted navigation systems, the user can control the navigation system by touching a screen (touch panel) on which a map is displayed. The operator can also control an audio-video (AV) system by touching the screen (touch panel) on which an AV control screen is displayed. For example, the user can perform operations such as playback, stop, and volume control by touching the control button on the screen on which a CD-player control screen is displayed.

The operator can determine whether or not he/she has touched the control button on the touch panel by the change in the color of the operation button or by beeper.

However, the operator has to actually see or hear the information. Accordingly, when the operator cannot look at the control screen carefully or when background sound is loud, the operator sometimes cannot confirm that he/she has touched the button.

For this problem, Japanese Unexamined Patent Application Publication No. 8-221173 (Patent Document 1) discloses an input device that provides tactile feedback by specified vibration to the finger when an operator pushes a control button on the touch panel, thereby allowing the operator to recognize that he/she has touched the control button.

However, the technique described in Patent Document 1 merely informs the operator of the fact that the switch of the touch panel is pushed by providing a specified vibration to the operator when the finger of the operator has touched the switch. At the time of playing back music by an audio system such as a CD player, when the operator performs an operation to speed up the playback action (e.g., FWD (fast-forward) key operation), the operator cannot recognize the degree of forwarding of the playback object even when he/she can recognize that the key has been pressed by the vibration. In sum, the operator cannot recognize the changes of the content of the object (music in this case).

Conventional systems have generated vibration on the touch panel when the operator continues to press a FWD key while listening to music played by a CD player, so that a "long key press" is confirmed. When the music being played is changed during the FWD operation, the title of the music is displayed on the display screen. The operator can thus recognize that the music has been changed by viewing the title displayed on the display screen, and when the music is changed to the desired music, the operator releases the FWD key, and selects the desired music.

With such conventional audio systems, the operator can recognize the information after the long key press is confirmed, and then the next music is started only when the operator looks at the display screen. This presents no problem as long as the audio system is not for vehicles. However, when the system is for vehicles and the operator is driving a car, the operator cannot look at the display screen for safety reasons. This therefore poses the problem of determining when the music has been changed to the desired music after a long key press.

SUMMARY OF THE INVENTION

The present invention is made in view of such problems. Accordingly, it is an object of the invention to provide a control input device with a vibrating function that allows an operator to recognize a change in the state of a control object after a long key press is confirmed.

To solve the problems of the related art, according to a first aspect of the invention, a vibration-function-equipped control input system is provided which includes: a display panel operable to display a control screen; a touch panel disposed on the display panel, a part of the touch panel corresponding to the location of a control key displayed on the control screen; a pressure-position detector operable to detect the position of the touch panel pressed; a vibration section operable to generate vibration to apply to the touch panel; and a controller operatively connected to the display panel, the touch panel, the pressure-position detector, and the vibration section. The controller directs the vibration section to generate a first vibration pattern when a predetermined time has passed after the control key is pushed, and subsequently directs the vibration section to generate a second vibration pattern when a control object controlled by the control key is changed.

In the vibration-function-equipped control input system, a touch panel is vibrated when a control key (e.g., the FWD key of a CD player) on the touch panel is continuously pressed for a predetermined time. Thus, the operator can determine that a long key press of the control key is confirmed.

The touch panel is also vibrated every time a control object (e.g., music played back by an audio reproducing system) changes while the control key is continuously pressed after the confirmation of a long key press. The vibration pattern at that time is different from that generated when the long key press of the control key is confirmed.

Thus, the operator can recognize that the music has changed without viewing the screen on which the title of the particular music is displayed.

To solve the problems of the related art, according to a second aspect of the invention, a vibration-function-equipped control input system is provided which includes: a display panel operable to display a control screen; a touch panel disposed on the display panel, a part of the touch panel corresponding to the location of a control key displayed on the control screen; a pressure-position detector operable to detect the position of the touch panel pressed; a vibration section operable to generate vibration to apply to the touch panel; and a controller operatively connected to the display panel, the touch panel, the pressure-position detector, and the vibration section. The controller directs the vibration section to generate a first vibration pattern when a predetermined time has passed after the control key is pushed, and subsequently directs the vibration section to generate a second vibration pattern when a gradually varying control object controlled by the control key has passed a predetermined reference point.

In this vibration-function-equipped control input system, a touch panel is vibrated when a control key (e.g., the volume control key of a CD player) on the touch panel is continuously pressed for a predetermined time. Thus, the operator can determined that a long key press of the control key is confirmed.

The touch panel is also vibrated when a control object (e.g., a gradually varying sound-level set value) passes a predetermined reference value while the control key is continuously pressed after the confirmation of the long key press. The vibration pattern at that time is different from that generated when the long key press of the control key is confirmed.

Thus, the operator can determine the sound level without viewing the screen on which the volume set value is displayed.

To solve the problems of the related art, according to a third aspect of the invention, a vibration-function-equipped control input system is provided which includes: a display panel operable to display a control screen; a touch panel disposed on the display panel, a part of the touch panel corresponding to the location of a control key displayed on the control screen; a pressure-position detector operable to detect the position of the touch panel pressed; a vibration section operable to generate vibration to apply to the touch panel; and a control operatively connected to the display panel, the touch panel, the pressure-position detector, and the vibration section. The controller directs the vibration section to generate a first vibration pattern when a predetermined time has passed after the control key is pushed, and subsequently directs the vibration section to generate a second vibration pattern when a control object controlled by the control key has reached a predefined value.

In this vibration-function-equipped control input system, a touch panel is vibrated when a control key (e.g., the frequency selection key of FM broadcasting) on the touch panel is continuously pressed for a predetermined time. Thus, the operator can determine that a long key press of the control key is confirmed.

The touch panel is also vibrated when a control object (e.g., field intensity for receiving FM broadcasting) reaches a predefined value while the control key is continuously pressed after the confirmation of the long key press. The vibration pattern at that time is different from that generated when the long key press of the control key is confirmed.

Thus, the operator can determine that FM broadcasting has been received without viewing the screen on which the frequency selected for FM broadcasting is displayed.

BRIEF DESCRIPTION OF THE DRAWINGS

FIG. 7 is a functional block diagram of a vibration-function-equipped control input system according to a second embodiment of the invention;

DESCRIPTION OF THE PREFERRED EMBODIMENTS

Embodiments of the invention will be described with reference to the drawings.

Structure of Car-Mounted Navigation and AV System

Figure 1:
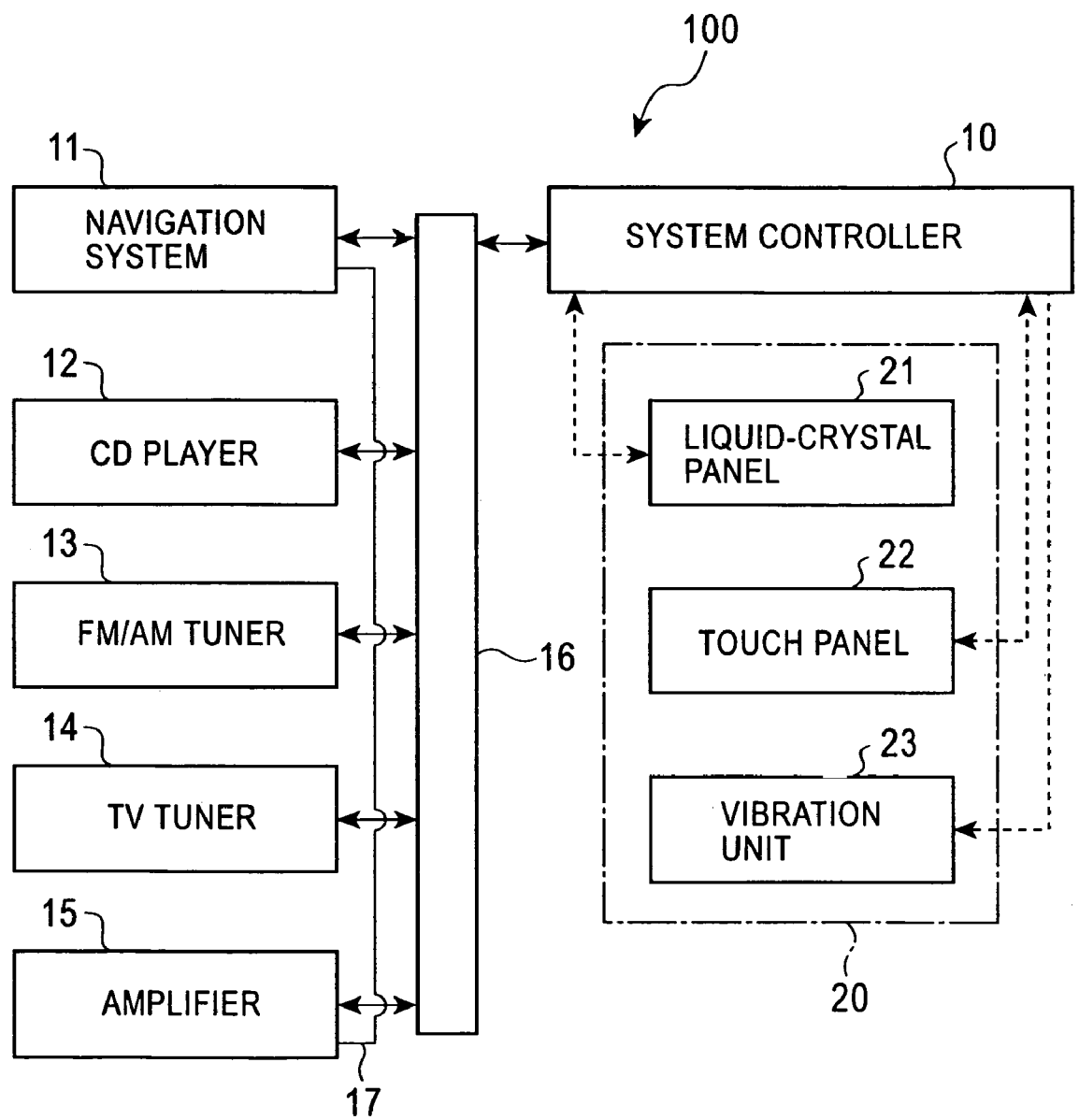
FIG. 1 is a block diagram of a car-mounted navigation and AV system incorporating a control input device with a vibration function according to embodiments of the invention.

FIG. 1 is a block diagram of a car-mounted navigation and AV system 100 incorporating a control input device with a vibration function according to embodiments of the invention. Here, the car-mounted navigation and AV system 100 indicates a system of a car-mounted navigation system and an AV system such as a CD player or a DVD player.

The car-mounted navigation and AV system 100 of the embodiments includes a system controller (control unit) 10, a navigation system 11, a CD player 12, an FM/AM tuner 13, a TV tuner 14, an amplifier 15, and a display unit 20. The system controller 10, the navigation system 11, the CD player 12, the FM/AM tuner 13, the TV tuner 14, and the amplifier 15 connect to one another via a common bus line 16. Various signals are transmitted to one another via the common bus line 16. Audio signals sent from the navigation system 11, the CD player 12, the FM/AM tuner 13, and the TV tuner 14 are received by the amplifier 15 via an audio bus line 17, are processed in the amplifier 15, and then sent to a speaker (not shown).

The navigation system 11 detects the present position of a vehicle using a global positioning system (GPS) receiver, a speed sensor, or a gyro, reads map data from a map-data storage unit that stores map data, such as a DVD, and transmits the image data (display signal) to the system controller 10 via the common bus line 16. The navigation system 11 also receives control signals (commands) from the system controller 10 via the common bus line 16 to operate according to the control signals.

The CD player 12, the FM/AM tuner 13, the TV tuner 14, and the amplifier 15 also receive control signals from the system controller 10 via the common bus line 16 to operate according to the control signals.

In addition to the foregoing systems, other AV systems such as an MD player, a DVD player, a video-CD compatible player, and an MP3-compatible player can be connected to the common bus line 16.

The display unit 20 includes a liquid-crystal panel 21, a touch panel 22, and a vibration unit 23.

First Embodiment

Figure 2:
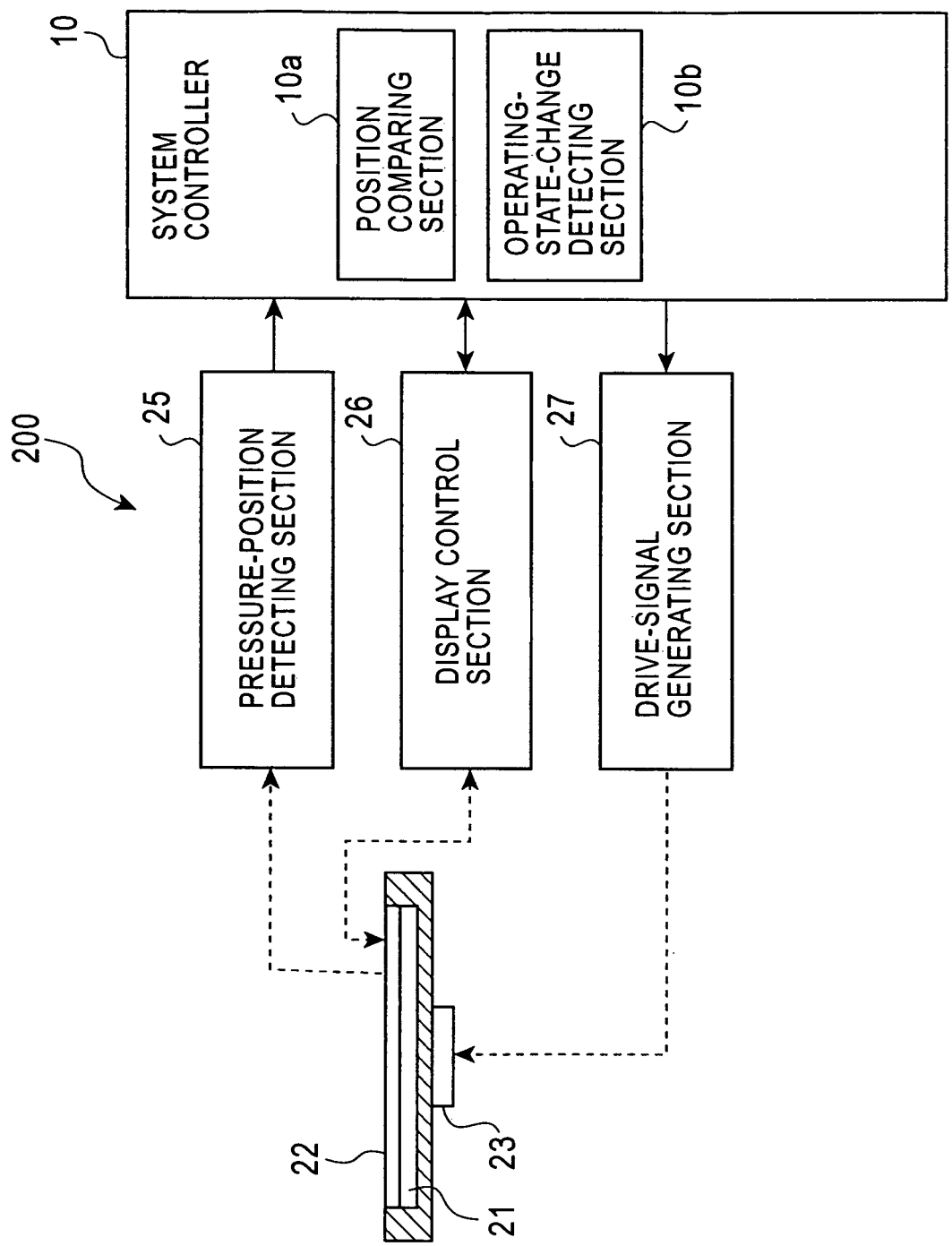
FIG. 2 is a functional block diagram of a control input system with a vibration function according to a first embodiment of the invention.

FIG. 2 is a functional block diagram of a control input system 200 with a vibration function according to a first embodiment of the invention.

As shown in FIG. 2, the vibration-function-equipped control input system 200 includes a pressure-position detecting section 25 that produces a detection signal depending on the position of the touch panel 22 pressed; a display control section 26 that allows the liquid-crystal panel 21 to display a control screen and obtains the position of a control key displayed on the control screen; and a drive-signal generating section 27 that generates vibration to be applied to the vibration unit 23.

The system controller 10 includes a position comparing section 10a that compares the position of the touch panel 22 pressed to the position of a control key displayed on the liquid-crystal panel 21; and an operating-state-change detecting section 10b that detects the change of music or the like to be controlled.

The display unit 20 has the touch panel 22 in front of the liquid-crystal panel 21, and the vibration unit 23 on the back of the liquid-crystal panel 21. The display unit 20 connects to the system controller 10 via the pressure-position detecting section 25, the display control section 26, and the drive-signal generating section 27.

In this vibration-function-equipped control input system 200, the system controller 10, the position comparing section 10a, and the operating-state-change detecting section 10b correspond to "a control unit"; the liquid-crystal panel 21 corresponds to "a display panel"; the vibration unit 23 and the drive-signal generating section 27 correspond to "a vibration section"; and the pressure-position detecting section 25 corresponds to "a pressure-position detector".

Figure 3:
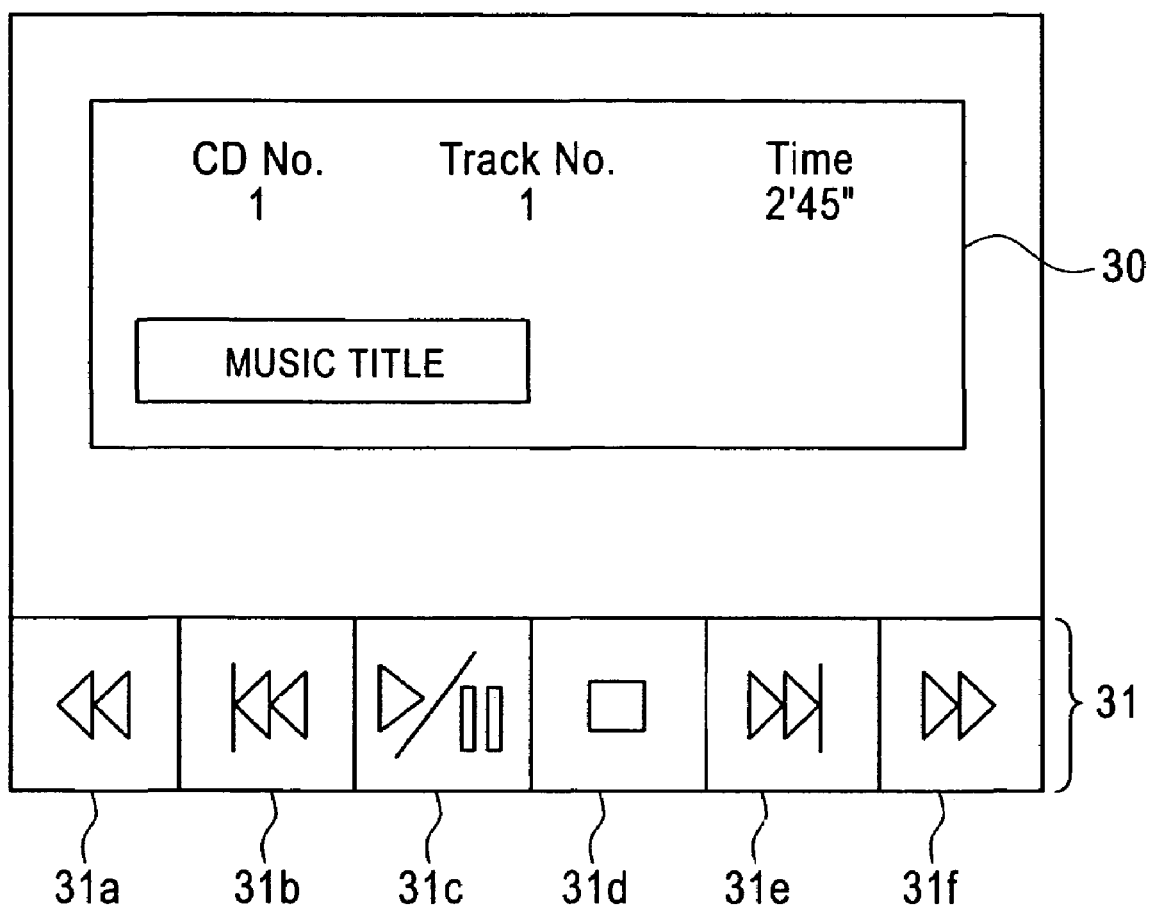
FIG. 3 is a diagram of an example of a CD-player control screen displayed on a liquid-crystal panel.

The operation of the vibration-function-equipped control input system 200 according to this embodiment will be described with reference to the timing chart shown in FIG. 4 and the flowchart shown in FIG. 5. Assume that the CD player 12 operates, so that the control screen for the CD player 12 is displayed on the liquid-crystal panel 21. The control screen in FIG. 3 displays a keypad 31 including a playback/pause button 31c and so forth; and a status display section 30 that displays a CD number, a track number, a playback time, and a music title. The control screen displays the operating state of the CD player 12 on the liquid-crystal panel 21 in response to a signal obtained from the CD player 12 by the system controller 10 (a signal indicative of whether it is in a stopped state or a playback state, and when it is in a playback state, signals indicative of the track number and playback time).

Figure 4:
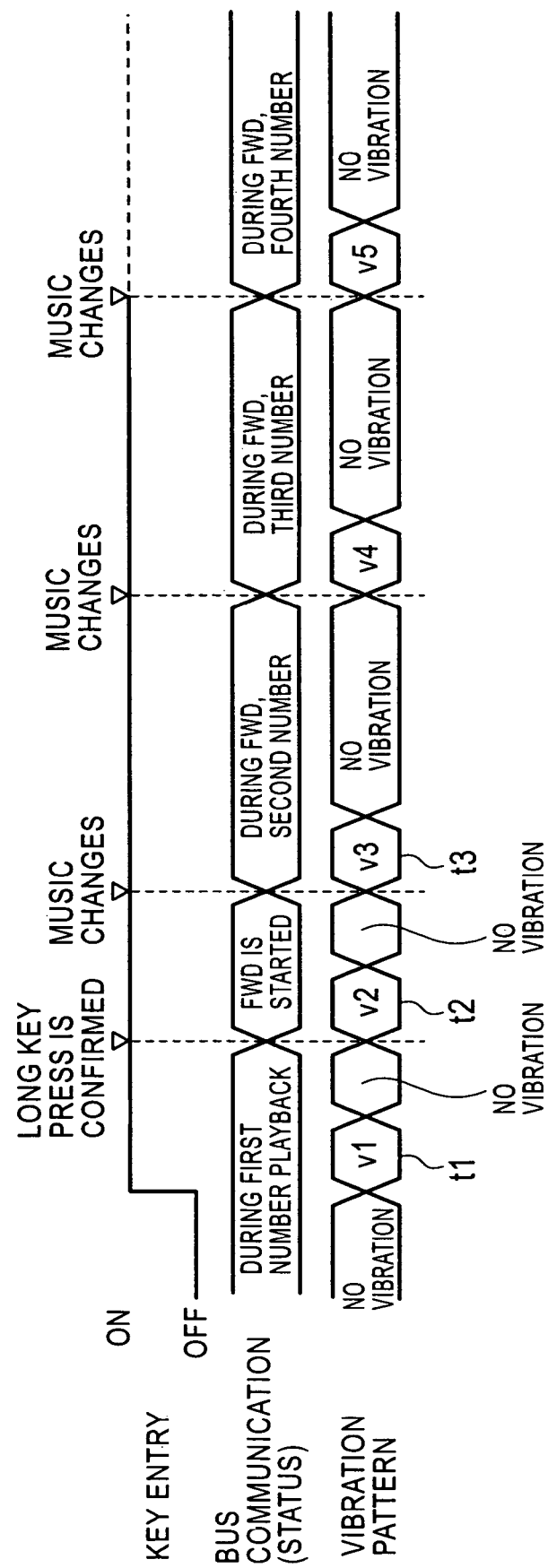
FIG. 4 is a timing chart showing an example of the relationship between the change of music and the vibration of a touch panel.

FIG. 4 is a timing chart for the relationship between changes of music and vibrations generated in the touch panel 22. In FIG. 4, OFF indicates a state in which any of the keys of the keypad 31 is not pressed; ON indicates a state in which a FWD key 31f of the keypad 31 is pressed. The BUS communication indicates a signal sent to the common bus line 16, showing the operating state of the CD player 12. The system controller 10 can obtain the operating state of the CD player 12 via the common bus line 16. Vibration patterns v1 and v2 indicate different vibration patterns.

The timing chart of FIG. 4 shows what vibration is applied to the operator at what timing while the operator continues to press the FWD key 31f on the control screen during the playback of the first number by the CD player 12.

When the FWD key 31f is turned on during the playback of the first number, a vibration of vibration pattern v1 is generated during a fixed time t1. When the FWD key 31f is continuously pressed for a fixed time after the FWD key 31f is turned on during the playback of the first number, a long key press is confirmed. When the long key press of the FWD key 31f is confirmed, the CD player 12 starts an FWD operation. Upon the start of the FWD operation, a vibration of vibration pattern v2 is generated for a fixed time t2.

When the music changes to the second number during the FWD operation, a vibration of vibration pattern v3 is generated for a fixed time t3 to indicate that the music has changed. Also when the music changes to the third number during the FWD operation, a specified vibration is generated for a fixed time.

Referring to the flowchart of FIG. 5, the process of vibrating the FWD key 31f while the operator continues to press the FWD key 31f during the playback of music by the CD player 12 will be described.

In step S11, the system controller 10 determines whether or not the FWD key 31f has been pressed.

The determination whether or not the key has been pressed is made as follows:

When the operator presses the surface of the touch panel 22 corresponding to a displayed position on the keypad 31, the pressure-position detecting section 25 detects the pressure to the keypad 31, and detects the pressed position on the touch panel 22. The pressure-position detecting section 25 sends the detected positional information to the position comparing section 10a of the system controller 10. The position comparing section 10a obtains the operated position of the keypad 31 that is displayed on the liquid-crystal panel 21 by the display control section 26, and compares the obtained key position and the position sent from the pressure-position detecting section 25. As a result of the comparison, when the positional information of the touch panel 22 obtained from the pressure-position detecting section 25 agrees with the positional information obtained from the display control section 26, it is determined that a valid key entry is made (e.g., the FWD key 31f is pressed, in this embodiment).

When a positive determination is made, the procedure moves to step S12; when a negative determination is made, the procedure returns to step S11 to determine whether or not the FWD key 31f has been pressed.

In the next step S12, a vibration for confirming the key entry is generated. Specifically, the system controller 10 instructs the drive-signal generating section 27 to generate vibration, thereby allowing the vibration unit 23 to generate vibration. The vibration at that time is a predetermined vibration pattern v1 for indicating that the FWD key 31f has been pressed, for example, only one vibration of "brr".

In the next step S13, it is determined whether or not the pressure to the FWD key 31f is "a long key press". Here the "long key press" indicates a state in which a key is continued to be pressed for a predetermined time or longer.

The determination on whether or not the FWD key 31f is pressed for a long key press is made as follows: the system controller 10 instructs the drive-signal generating section 27 to generate vibration for confirming key entry in step S12, and at the same time, starts the measurement of time using a timer built into the system controller 10. When a predetermined time has passed from the start of time measurement that the FWD key 31f is continuously pressed, it is determined that a long key press is confirmed.

When a long key press is not confirmed, the procedure moves to step S14; when a long key press is confirmed, the procedure moves to step S15.

In step S14, it is determined whether or not the pressure to the FWD key 31f has been finished. The pressure to the FWD key 31f is determined from a signal sent from the pressure-position detecting section 25 to the system controller 10. When the finger separates from the FWD key 31f, this process ends. When the pressure to the FWD key 31f is continued to be applied, the procedure returns to step S13, wherein it is determined whether or not a long key press is confirmed.

In the next step S15, the system controller 10 instructs the drive-signal generating section 27 to generate vibration for notifying the operator that a long key press is confirmed. The vibration for notifying the operator of the confirmation of the long key press is different from that for confirmation of key entry. For example, for the confirmation of key entry, only one vibration is generated; for the confirmation of long key press, two vibrations (such as "brrr") are generated. The intensity (amplitude) of the vibration may be varied for alternate or further discrimination.

In the next step S16, it is determined whether or not the music has changed in a state in which the same key (the 31*f* in this embodiment) is continuously pressed after the confirmation of the long key press (hereinafter, referred to as a long key press state).

The determination on whether or not the music has changed is made as follows: the system controller 10 obtains table-of-contents (TOC) information and audio information from the CD player 12 via the common bus line 16. The TOC information includes the start positions of music pieces (the times at which tracks start). The audio information includes the elapsed time of music during playback. The operating-state-change detecting section 10*b* of the system controller 10 determines whether or not music has shifted to the next number during FWD operation on the basis of such information.

When the music has shifted to the next number, the procedure moves to step S17; when the music has not changed, the procedure moves to step S18.

In the next step S17, the process of generating vibration for indicating a change of music is executed.

When the music has shifted to the next number while the FWD key 31*f* is in a long key press state, the system controller 10 instructs the drive-signal generating section 27 to generate a vibration of the vibration pattern v3. The vibration pattern v3 is different from the vibration pattern v1 for confirming that the FWD key 31*f* is pressed and the vibration pattern v2 for confirming the long key press.

In the next step S18, it is determined whether or not the long key press state has ended. When the long key press state has not ended, the procedure returns to step S16, wherein it is determined whether or not the music has further shifted to the next number.

When the music has further shifted to the next number in a long key press state, the system controller 10 instructs the drive-signal generating section 27 to generate vibration in step S17. The vibration pattern at that time may be either the vibration pattern v3 or a vibration pattern different from that. In contrast, when the finger no longer presses the FWD key 31*f* to finish the long key press state, the process is terminated.

As described above, in the vibration-function-equipped control input system 200 of this embodiment, the touch panel 22 vibrates when the key on the touch panel 22 is pressed. Thus, the operator can confirm that key entry has become valid.

Also when a long key press is confirmed, the touch panel 22 vibrates. The vibration pattern at that time is different from that when a key is pressed. Thus, the operator can easily confirm that a long key press is confirmed.

Furthermore, the touch panel 22 vibrates every time object music changes while the key is being pressed after the confirmation of the long key press. The vibration pattern at that time is different from the vibration patterns when a key is pressed and when a long key press is confirmed. Thus, the operator can confirm that music has changed without viewing a display screen, thus improving convenience. It is advantageous particularly while driving a vehicle.

While the embodiment has been described for the FWD operation of the CD player 12, the invention is not limited to such an operation, but may be applied to a BWD (reverse) operation. Also, the invention may be applied not only to the CD player 12 but also to other audio reproducing systems.

Modification

In the first embodiment, the touch panel 22 vibrates every time music changes after the long key press of the FWD key 31*f* has been confirmed in controlling the CD player 12. In contrast, the touch panel 22 may vibrate not for each number but for each folder of music pieces.

Figure 6A:
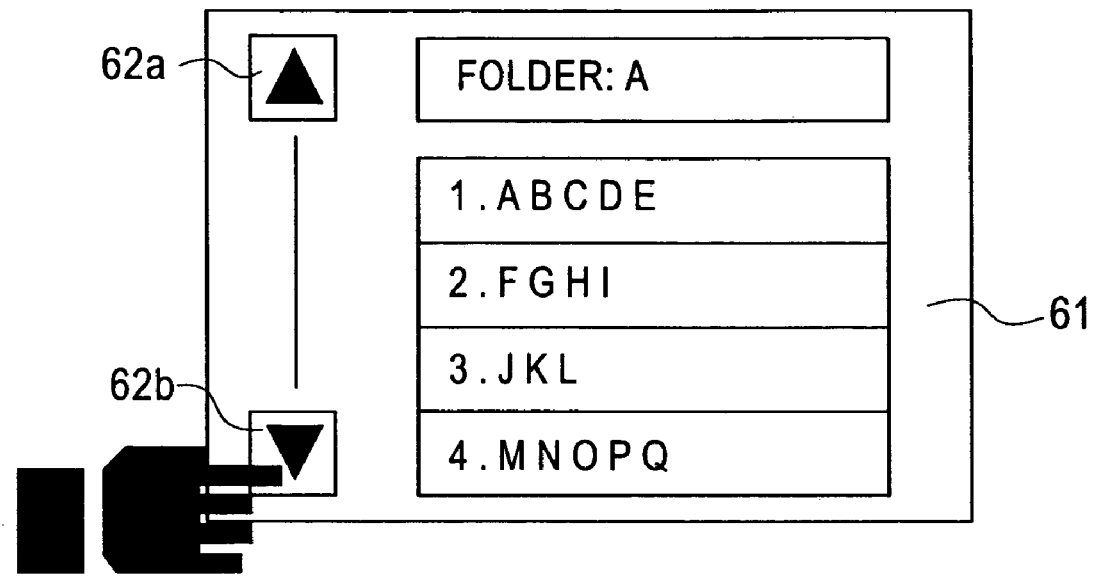
FIG. 6A is a diagram of an example of an MP3-player control screen displayed on a liquid-crystal panel.
Figure 6B:
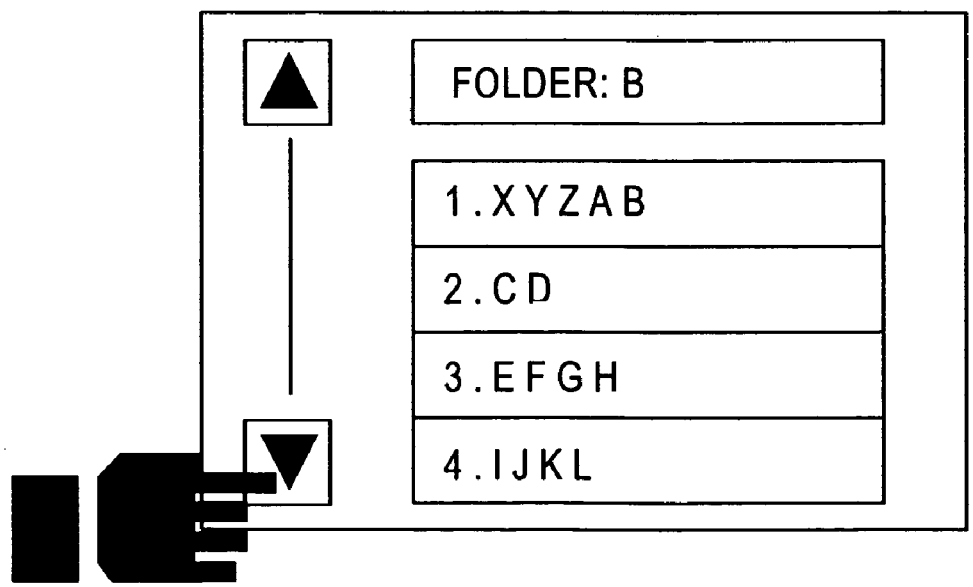
FIG. 6B is a diagram of an example of an MP3-player control screen displayed on a liquid-crystal panel.

FIGS. 6A and 6B show examples of a control screen for changing a playback file 61 using a FILE DOWN key 62*b* in the playback mode of an MP3- or WMA (Windows media audio)-compatible player. FIG. 6A shows a screen on which four music titles (the playback file 61) contained in folder A are displayed. The music titles contained in folder A is scrolled down and displayed one after another by the FILE DOWN key 62*b* pressed for a long time. When all the titles in folder A have been displayed in this way, folder A shifts to the next folder.

FIG. 6B shows the next control screen after folder A has shifted to folder B. When the folder has shifted to folder B, as shown in FIG. 6B, the FILE DOWN key 62*b* in a long key press state vibrates, so that the operator can confirm that the folder has shifted.

Figure 5:
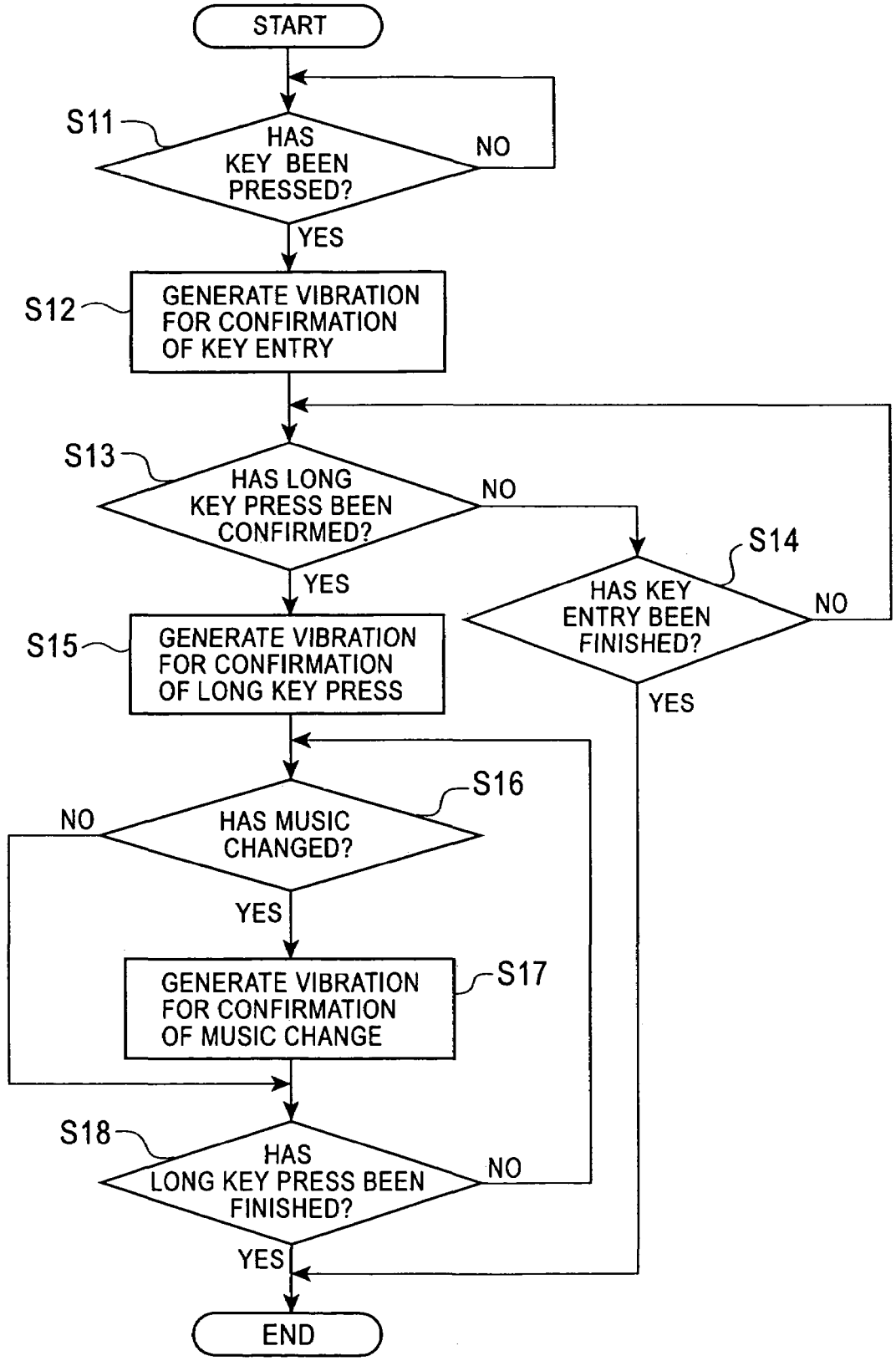
FIG. 5 is a flowchart for the process of generating vibration according to the first embodiment.

In this modification, a determination on whether or not the folder has shifted to the next folder is made in step S16 of FIG. 5. The determination on whether or not the folder has shifted to the next folder is made by the system controller 10 according to a signal from the MP3 player, which indicates that the folder has shifted to the next folder. Then the procedure moves to step S17, wherein a vibration indicating that the folder has shifted to the next folder is generated in the FILE DOWN key 62*b*.

As shown in the modification, the vibration-function-equipped control input system 200 according to the first embodiment can vibrate the touch panel 22 every time the folder changes during the playback of an MP3- or WMA-compatible player.

This modification can also vibrate a FILE UP key 62*a* when the FILE UP key 62*a* is pressed to return from folder B to the preceding folder A.

According to the first embodiment and its modification, an audio reproducing system has been described as a control object system. The control object system is not limited to that but may be a video reproducing system such as a DVD. For example, while an image or video that is played back by a DVD is forwarded or reversed, the touch panel 22 can be vibrated every chapter or section of the image or video.

Second Embodiment

A vibration-function-equipped control input system 200*a* according to a second embodiment of the invention will be described hereinbelow.

The second embodiment is different from the first embodiment in that the control object is a finite value that varies gradually and has a reference point being a higher limit, a lower limit, or a median. When the sound level has passed through the reference point, the touch panel is vibrated.

FIG. 7 is a functional block diagram of a vibration-function-equipped control input system 200*a* according to the second embodiment. This embodiment is also an application of the invention to the car-mounted navigation and AV system 100. The difference between the second embodiment and the first embodiment is that a system controller 10A has a reference-point-passage detecting section (control section) 10*c*. The other structure and operation (function) are basically the same as those of the first embodiment. Accordingly, the same components in FIG. 7 as those of FIG. 2 are given the same reference numerals and their detailed description will be omitted.

The case of controlling the volume of the CD player 12 with this system will be described by way of example.

Figure 8:
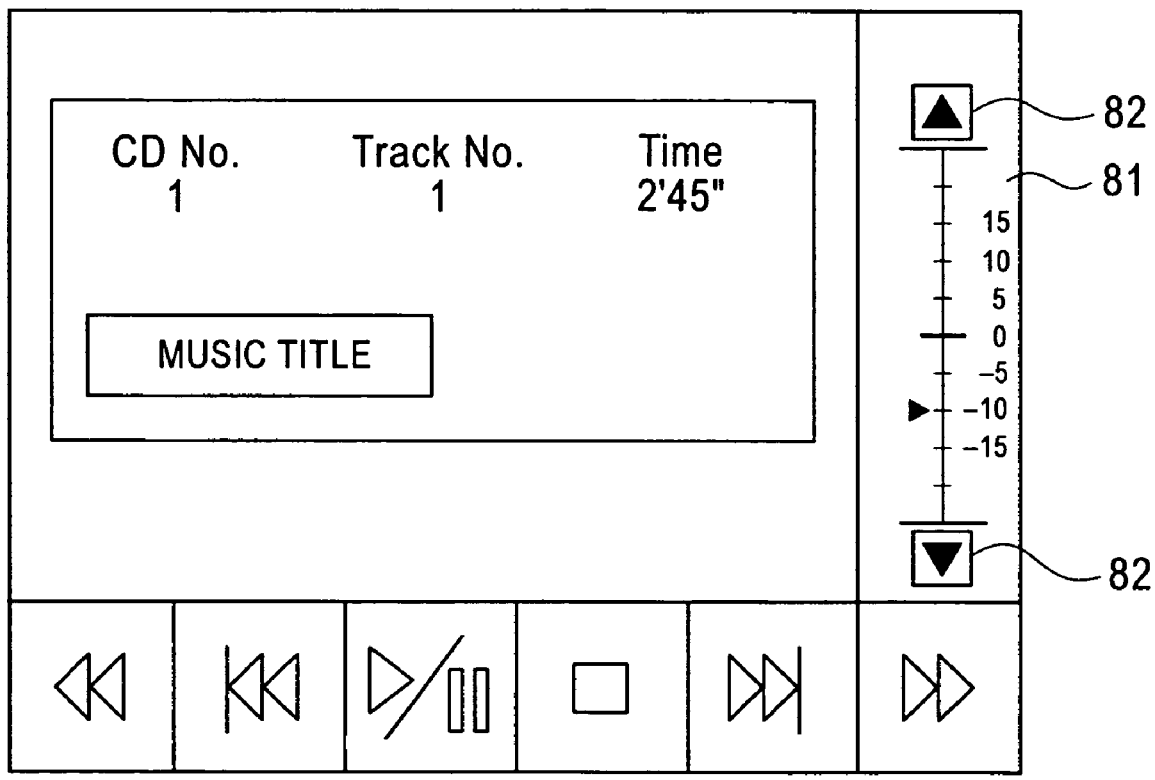
FIG. 8 is a diagram of an example of a CD-player control screen displayed on a liquid-crystal panel.

FIG. 8 is a diagram of an example of the screen display when a volume control key 82 of the CD player 12 is pressed for a long time to control the volume. As shown in FIG. 8, an indicator 81 that indicates the volume indicates the reference sound level with a value 0, levels lower than that with minus values, and levels higher than that with plus values. FIG. 8 shows a state in which the volume control key 82 is pressed to continuously tune up the volume when the sound level is minus.

Figure 9:
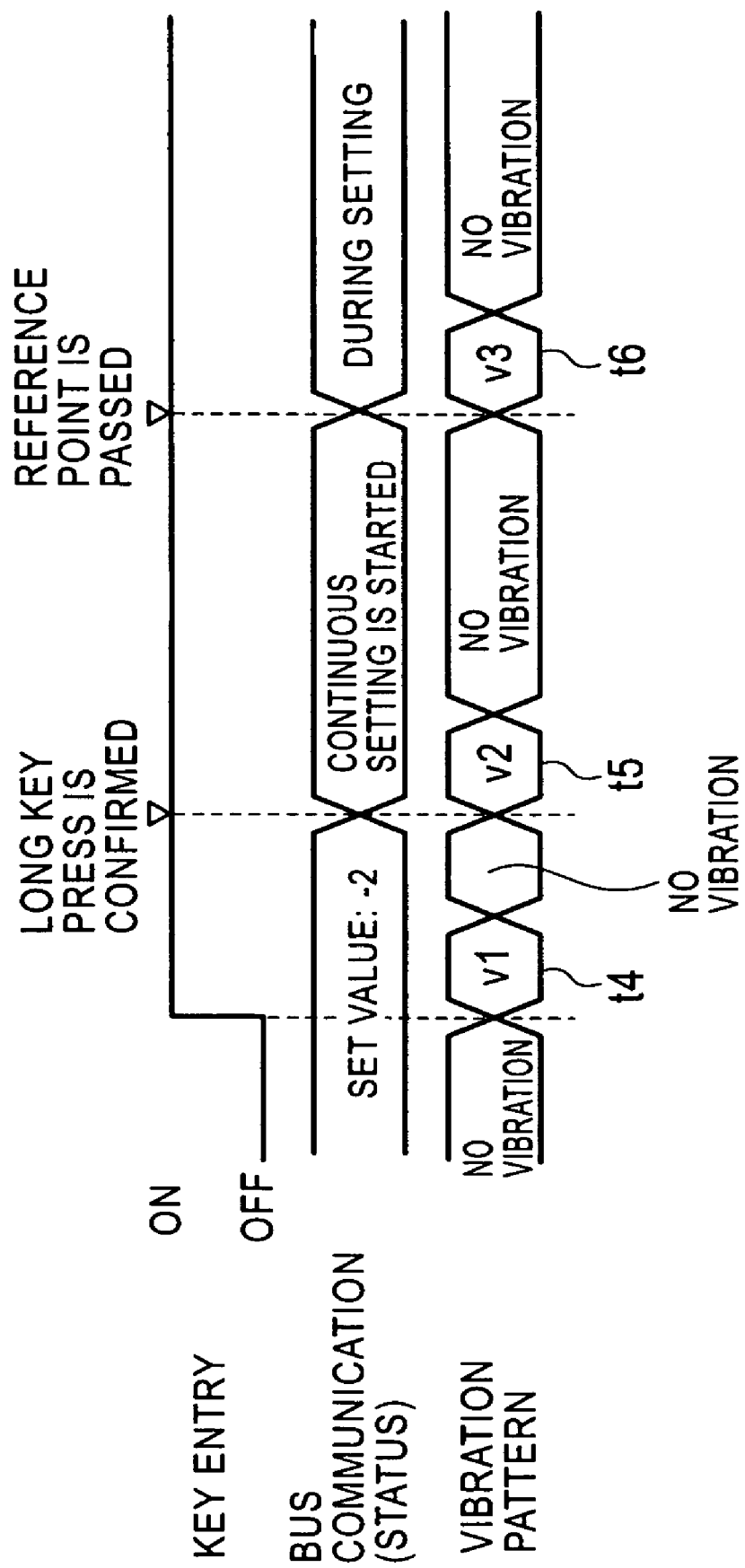
FIG. 9 is a timing chart showing an example of the relationship between the reference point of a set value and vibrations generated in the touch panel.

FIG. 9 is a timing chart for the relationship between the passage of the reference point and vibrations generated in the touch panel 22. In FIG. 9, the BUS communication indicates a signal sent from the CD player 12 to the common bus line 16. The system controller 10A obtains the status of the set value (the sound level) via the common bus line 16.

The timing chart of FIG. 9 shows what vibration is applied to the operator at what timing while the operator continues to press the volume control key 82 on the control screen of FIG. 8.

When the volume control key 82 is turned on, a vibration of vibration pattern v1 is generated during a fixed time t4. When the volume control key 82 is continuously pressed for a predetermined time after the key entry is turned on, a long key press is confirmed, and then the CD player 12 starts a setting operation while increasing the sound level. Upon the start of the continuous setting operation, a vibration of vibration pattern v2 is generated for a fixed time t5.

When the sound level has passed through the reference point after the start of sound-volume continuous setting, a vibration of vibration pattern v3 is generated for a fixed time t6.

Figure 10:
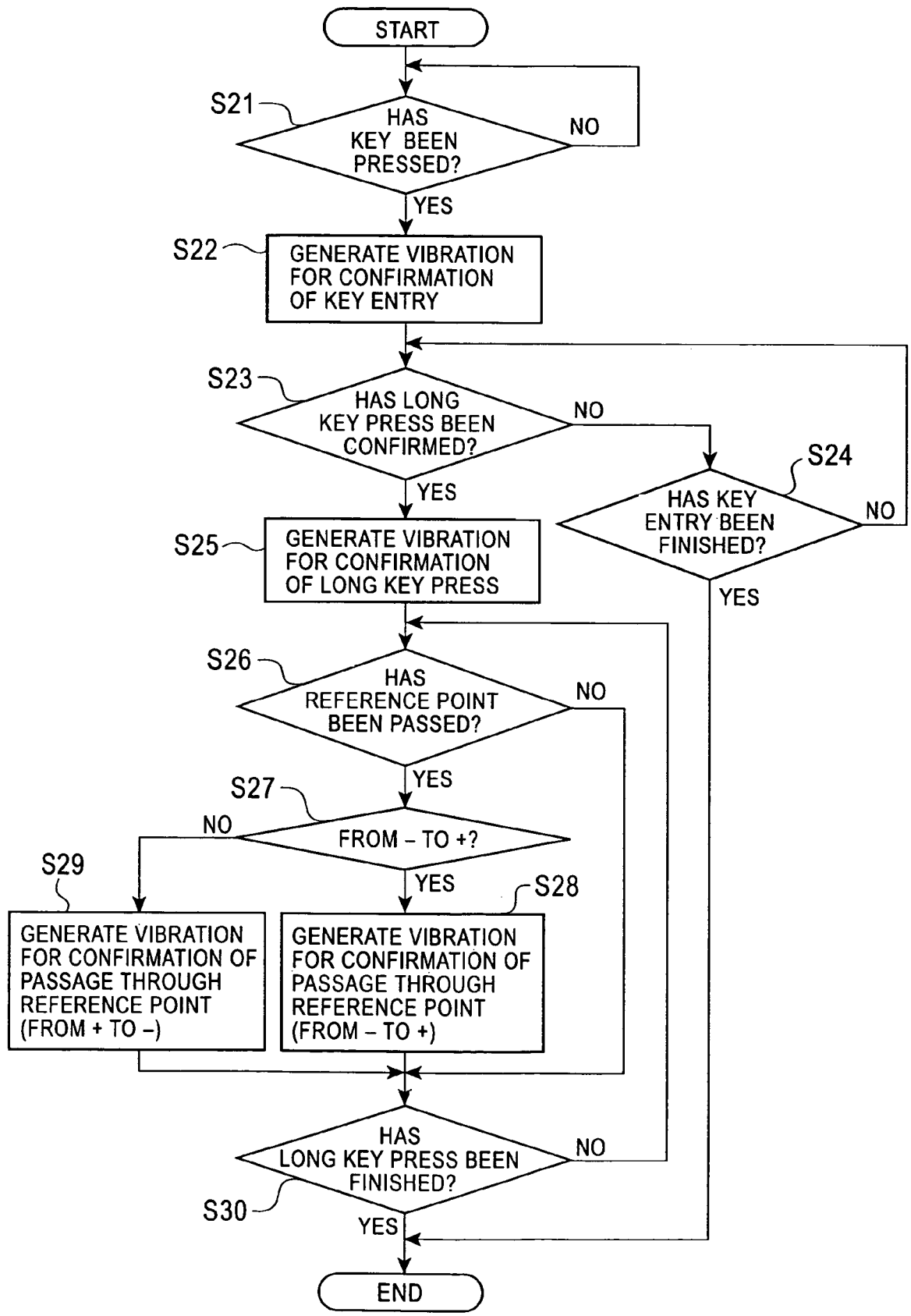
FIG. 10 is a flowchart for the process of generating vibration according to the second embodiment.

Referring to the flowchart of FIG. 10, the process of vibrating the touch panel 22 will be described hereinbelow.

Since steps S21 to S25 are the same as steps S11 to S15 according to the first embodiment (FIG. 5), their description will be omitted.

Here the process will be described from step S26 after the long key press is confirmed in step S25.

In step S26, it is determined whether or not the sound level has passed the reference point ("0" in this embodiment) during the long key press of the volume control key 82.

The determination whether or not the sound level has passed the reference point is made as follows: the system controller 10A obtains information on the sound level set by the CD player 12 via the common bus line 16, and the reference-point-passage detecting section 10c determines whether or not the sound level has passed the reference point on the basis of the information.

When a positive determination is made, the procedure moves to step S27; when a negative determination is made, the procedure returns to step S30.

In the next step S27, it is determined whether the sound level has shifted from a minus value through the reference point to a plus value or shifted from a plus value through the reference point to a minus value in the reverse direction.

The determination in which direction the sound level has passed is made by comparison of the sound levels before and after the passage through the reference point by the reference-point-passage detecting section 10c.

When it is determined that the sound level has passed the reference point from a minus value to a plus value, the procedure moves to step S28; when it is determined that the sound level has passed the reference point from a plus value to a minus value, the procedure moves to step S29.

In step S28, a vibration for confirming that the sound level has passed the reference point when it changes from a minus level to a plus level is generated.

When the sound level has passed the reference point when it changes from a minus level to a plus level when the volume control key 82 is in a long key press state, the system controller 10A instructs the drive-signal generating section 27 to generate a vibration pattern v3. This vibration pattern is different from the vibration pattern v1 for confirming that the volume control key 82 is pressed and the vibration pattern v2 for confirming that a long key press is confirmed.

In step S29, a vibration for confirming that the sound level has passed the reference point when it changes from a plus level to a minus level is generated. In this case, a vibration of a different pattern from the vibration pattern v3 generated in step S28 is generated.

In the next step S30, it is determined whether or not the long key press state has ended. When the long key press state has not ended, the procedure returns to step S26, wherein it is further determined whether or not the sound level has passed the reference point. In contrast, when the finger separates from the volume control key 82 to finish the long key press state, the process is terminated.

As described above, in the vibration-function-equipped control input system 200a of this embodiment, the touch panel 22 is vibrated when the sound level has passed the reference point while the key is being continuously pressed after the long key press of the volume control key 82 has been confirmed. Thus, the operator can confirm the sound level without viewing the sound-level display screen.

While the embodiment has been described for volume control by way of example, the control object is not limited to that, but the invention can be applied to the setting of gradually and continuously changing values, such as the lightness or contrast of a screen.

Modification

In the second embodiment, the reference point in setting the sound level is set to the median value of gradually, continuously varying values, and when it varies from a minus value to a plus value, or from a plus value to a minus value, vibration is generated. Accordingly, it cannot be determined whether the gradually, continuously varying value has reached the last value (the higher limit). When the control object varies gradually, continuously to reach the last value, and then returns to the initial value (the lower limit) to circulate, the touch panel 22 may be vibrated when the sound level reaches the higher limit or the lower limit. Conversely, also when the sound level varies gradually, continuously to reach the initial value (the lower limit), and then returns to the last value (the higher limit) to circulate, the touch panel 22 may be vibrated when the sound level reaches the higher limit or the lower limit.

Set items whose set value circulates include clock time setting, selection of the letters of the alphabet in entering characters, and so on. For example, for time setting, set time varies from 0:00 to 11:59 by continuing to press a set key. The set time varies again from 0:00 by continuing to press the set key. In the case where the set value circulates in this way, the touch panel 22 is vibrated when the set value has reached the initial value (e.g., 0:00 in this case).

This allows the operator to realize that the set value has returned to the initial value without viewing the display screen, and find the level of the set value.

Third Embodiment

A vibration-function-equipped control input system 200b according to a third embodiment of the invention will be described hereinbelow.

The third embodiment is different from the first and second embodiments in that the control object is field intensity when receiving FM broadcasting and so on; and the touch panel is vibrated when the field intensity has reached a predefined value.

Figure 11:
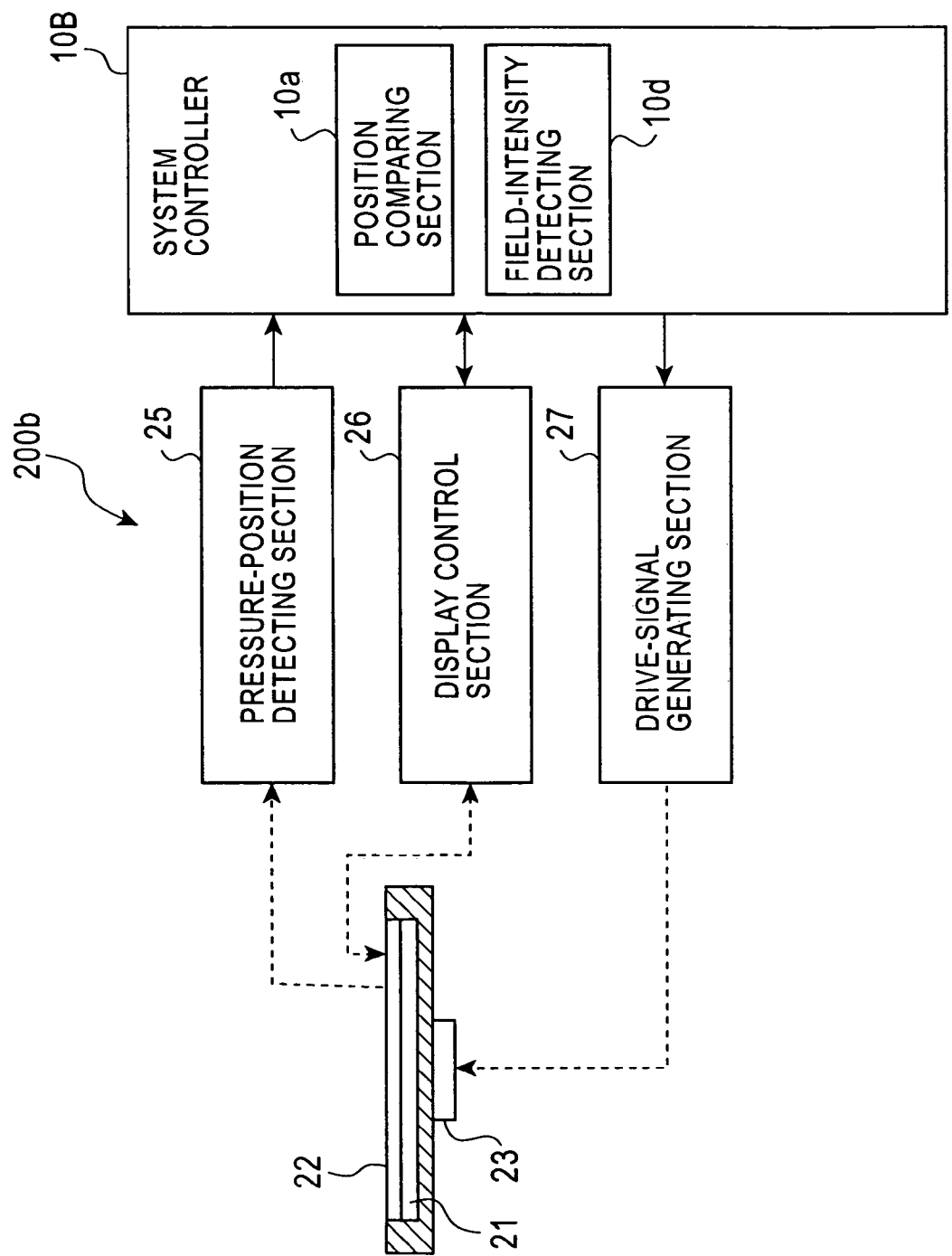
FIG. 11 is a functional block diagram of a vibration-function-equipped control input system according to a third embodiment of the invention.

FIG. 11 is a functional block diagram of a vibration-function-equipped control input system 200*b* according to the third embodiment. This embodiment is also an application of the invention to the car-mounted navigation and AV system 100. The difference between this embodiment and the first and second embodiments is that a system controller 10B has a field-intensity detecting section (control section) 10*d*. The other structure and operation (functions) are basically the same as those of the first embodiment. Accordingly, the same components in FIG. 10 as those of FIG. 2 are given the same reference numerals and their detailed description will be omitted.

The case of receiving FM broadcasting with this field-intensity detecting section 10*d* will be described by way of example.

Figure 12A:
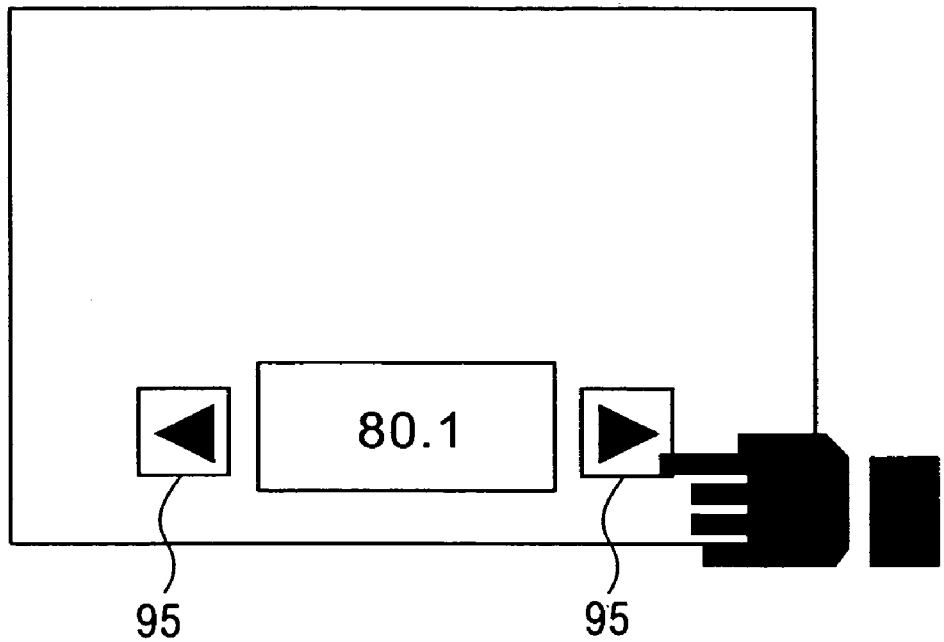
FIG. 12A is a diagram showing an example of an FM-tuner control screen displayed on a liquid-crystal panel.
Figure 12B:
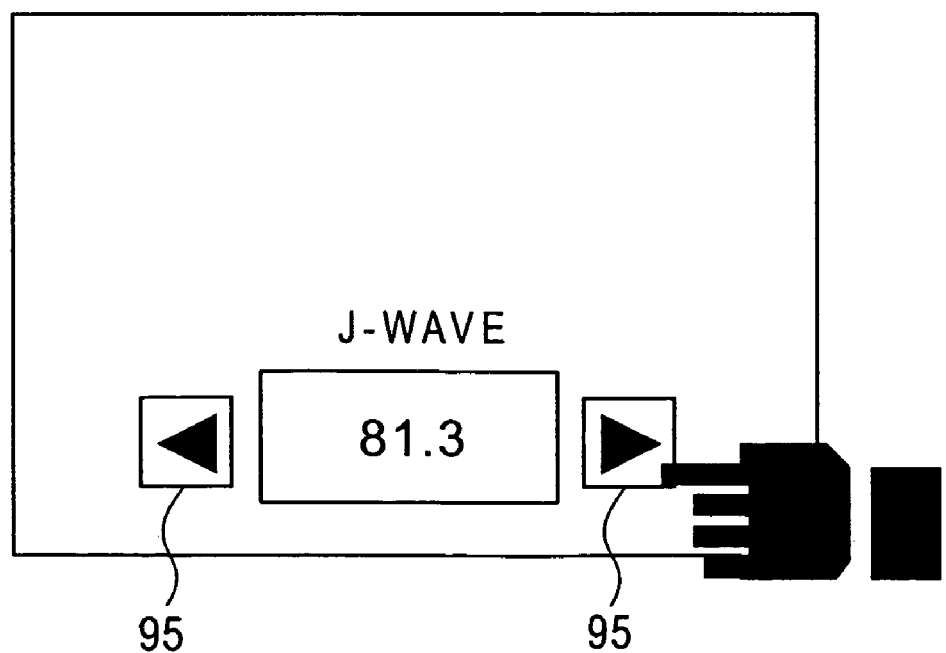
FIG. 12B is a diagram showing an example of an FM-tuner control screen displayed on a liquid-crystal panel.

FIGS. 12A and 12B show examples of the screen display when the reception frequency is changed by pressing a frequency-selection key 95 for a long time during the reception of FM broadcasting.

As shown in FIG. 12A, information on the frequency selected to receive FM broadcasting is sent from the touch panel 22 to the system controller 10B. The frequency information is transferred to the FM/AM tuner 13 via the common bus line 16. The FM/AM tuner 13 receives FM broadcasting at the transferred frequency, and sends a signal indicative of the receiving state (field intensity) to the system controller 10B.

Figure 13:
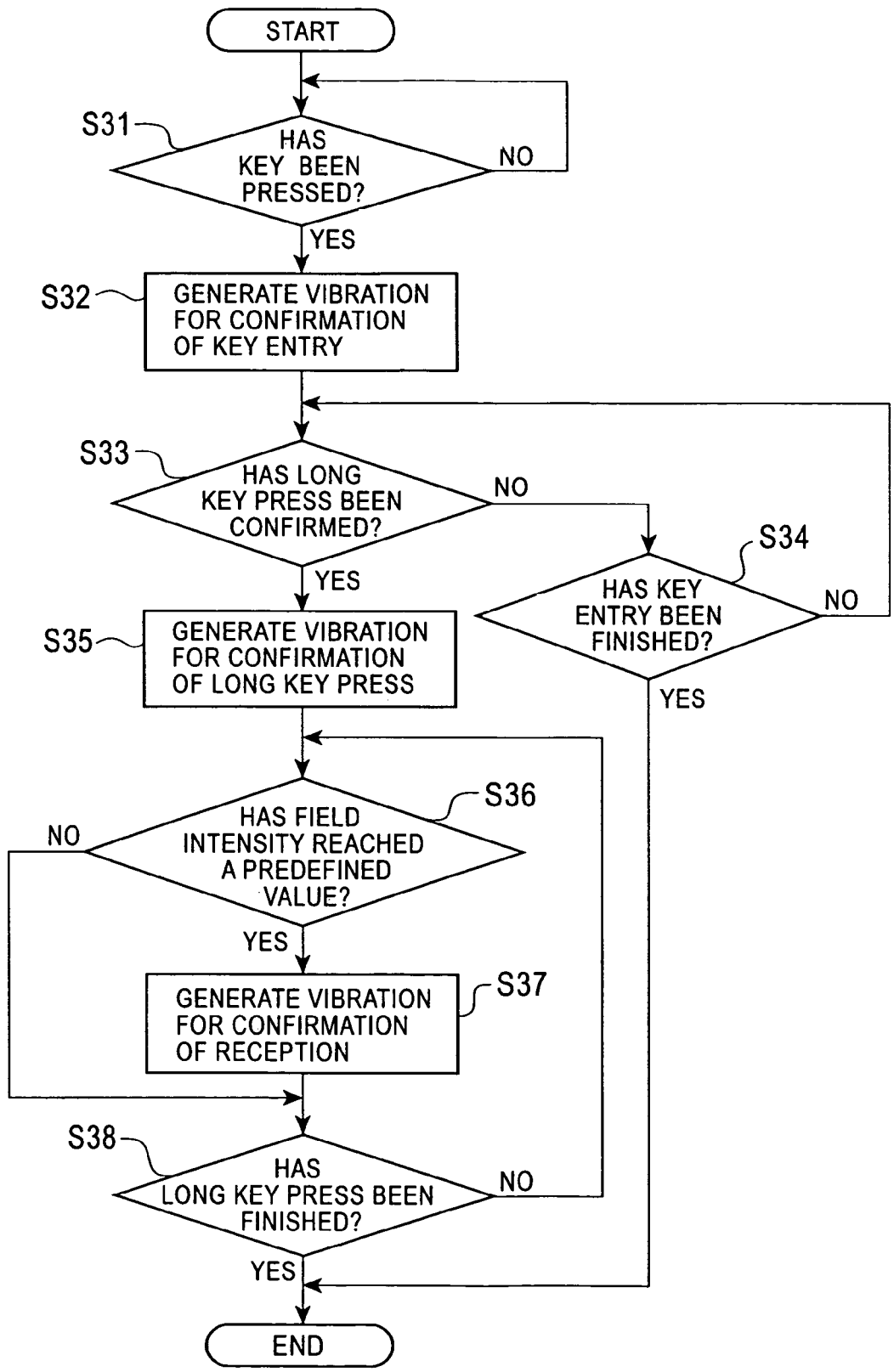
FIG. 13 is a flowchart for the process of generating vibration according to the third embodiment.

FIG. 13 is a flowchart for the operation of generating vibration according to the third embodiment. Since steps S31 to S35 are the same as steps S11 to S15 according to the first embodiment (FIG. 5), their description will be omitted.

Here the process will be described from step S36 after the long key press is confirmed in step S35.

In step S36, it is determined whether or not the field intensity has reached a predefined value during the long key press of the frequency-selection key 95. In other words, it is determined whether FM broadcasting can be received depending on whether the field intensity has reached a predefined value. The determination whether or not the field intensity has reached a predefined value is made as follows: the operator presses the frequency-selection key 95 to receive FM broadcasting. Information on the frequency selected by pressure is sent from the touch panel 22 to the system controller 10B. The frequency information is transferred to the FM/AM tuner 13 via the common bus line 16, and the FM/AM tuner 13 receives FM broadcasting with the designated frequency. The FM/AM tuner 13 sends a signal indicative of the receiving state (field intensity) of the frequency. The system controller 10B obtains the information via the common bus line 16. The field-intensity detecting section 10*d* determines whether or not the obtained field intensity has reached a predefined value.

When the field intensity has reached a predefined value, the procedure moves to step S37; when it has not reached a predefined value, the procedure moves to step S38.

In the next step S37, a vibration for confirming that the field intensity has reached a predefined value to allow reception of broadcasting is generated. The system controller 10B instructs the drive-signal generating section 27 to generate vibration. This vibration pattern is different from the vibration pattern for confirming that the frequency-selection key 95 is pressed and the vibration pattern v2 for confirmation that long key press is confirmed.

In the next step S38, it is determined whether or not the long key press state has ended. When the long key press state has not ended, the procedure returns to step S36, wherein it is determined whether or not the next broadcasting has been received.

When the next broadcasting can be received in a long key press state, the system controller 10B instructs the drive-signal generating section 27 to generate vibration in step S37. The vibration pattern at that time may be either the same or different for the received broadcastings. When the finger separates from the frequency-selection key 95 to finish the long key press state, the process is terminated.

As described above, in the vibration-function-equipped control input system 200*b* of this embodiment, when the operator selects a broadcasting station by pressing the frequency-selection key 95 while listening to FM broadcasting, the touch panel 22 is vibrated every time the field intensity reaches a predefined value to allow reception of broadcasting. Thus, the operator can recognize the reception of broadcasting by vibration without viewing the display screen.

While the embodiment has been described for the FM tuner by way of example, the control object system is not limited to that, but the invention can be applied to other broadcasting receiving sets, such as an AM tuner or a TV tuner.

Although the first to third embodiments and their modifications have been described for the case in which the vibration-function-equipped control input systems (200, 200*a*, and 200*b*) are applied to the car-mounted navigation and AV system 100, the invention is not limited to that. For example, the invention can be applied to a single audio system or video system.

What is claimed is:

1. A vibration-function-equipped control input system comprising:

a display panel operable to display a control screen;

a touch panel disposed on the display panel, an area of the touch panel defining a control key, the control key being displayed on the control screen and configured to adjust a setting of a control object controlled by pressing at least a portion of the area of the touch panel defining the control key;

a pressure-position detector operable to detect a pressed position of the touch panel when the touch panel is pressed;

a position comparing section operable to determine if the pressed position of the touch panel is within a same area as the area of the touch panel defining the control key;

a vibration section operable to generate vibration to apply to the touch panel; and a controller operatively connected to the display panel, the touch panel, the pressure-position detector, the position comparing section, and the vibration section, wherein the controller directs the vibration section to generate a vibration for confirming a key entry when the position comparing section determines that the pressed position of the touch panel is within the area of the touch panel defining the control key; and when the position comparing section determines that the pressed position of the touch panel is within the area of the touch panel defining the control key, a timer starts measuring a time elapsed during which the pressed position of the touch panel (1) remains within the area of the touch panel defining the control key and (2) has been continuously pressed, and if the time elapsed that the pressed position of the touch panel remains within the area of the touch panel defining the control key and has been continuously pressed reaches a pre-determined time, the controller further directs the vibration section to generate a first vibration pattern at the area of the touch panel defining the control key to confirm the entry of a long key press, and subsequently directs the vibration section to generate a second vibration pattern at the area of the touch panel defining the control key if the pressed position of the touch panel remains within the area of the touch panel defining the control key and is continued to be pressed for a period of time after the entry of the long key press such that a current setting of the control object controlled by the control key is changed by the continued pressing of at least a portion of the area of the touch panel defining the control key.

2. The vibration-function-equipped control input system according to claim 1, wherein the second vibration pattern varies every time the current setting of the control object changes by pushing the control key.

3. The vibration-function-equipped control input system according to claim 2, wherein the control object is music to be played by a sound reproducing system.

4. The vibration-function-equipped control input system according to claim 1, wherein the control object is music to be played by a sound reproducing system.

5. The vibration-function-equipped control input system according to claim 1, wherein the control object is a folder of selectable music pieces.

6. The vibration-function-equipped control input system according to claim 1, wherein the control object is a section of video to be played by a video reproducing system.

7. A vibration-function-equipped control input system comprising:
  a display panel operable to display a control screen;
  a touch panel disposed on the display panel, an area of the touch panel defining a control key, the control key being displayed on the control screen in the area of the touch panel defining the control key and configured to adjust a setting of a control object controlled by the control key when the at least a portion of the area of the touch panel defining the control key is pressed;
  a pressure-position detector operable to detect a position of the touch panel pressed;
  a position comparing section operable to determine if the pressed position of the touch panel is within a same area as the area of the touch panel defining the control key;
  a vibration section operable to generate vibration to apply to the touch panel; and
  a controller operatively connected to the display panel, the touch panel, the pressure-position detector, the position comparing section, and the vibration section, wherein
  the controller directs the vibration section to generate a vibration for confirming a key entry when the position comparing section determines that the pressed position of the touch panel is within the area of the touch panel defining the control key; and
  when the position comparing section determines that the pressed position of the touch panel is within the area of the touch panel defining the control key, a timer starts measuring a time elapsed during which the pressed position of the touch panel (1) remains within the area of the touch panel defining the control key and (2) has been continuously pressed, and
  the controller further directs the vibration section to generate a first vibration pattern at the area of the touch panel defining the control key when the time elapsed that the pressed position of the touch panel remains within the area of the touch panel defining the control key and has been continuously pressed reaches a predetermined time to confirm the entry of long key press, and subsequently directs the vibration section to generate a second vibration pattern at the area of the touch panel defining the control key when a setting of a gradually varying value of the control object controlled by the continued pressing of at least a portion of the area of the touch panel defining the control key has passed a predetermined reference point.

8. The vibration-function-equipped control input system according to claim 7, wherein the second vibration pattern varies depending upon the direction of the change in the setting of the gradually varying value of the control object.

9. The vibration-function-equipped control input system according to claim 7, wherein the setting of the gradually varying value of the control object has a lower limit, a median, and a higher limit, wherein after changing from the lower limit to the higher limit, the control object shifts to the lower limit, and after changing from the higher limit to the lower limit, the control object shifts to the higher limit.

10. The vibration-function-equipped control input system according to claim 7, wherein the predetermined reference value is the median of the gradually varying value of the control object.

11. The vibration-function-equipped control input system according to claim 10, wherein the control object is a gradually, continuously varying sound level.

12. The vibration-function-equipped control input system according to claim 10, wherein the control object is a gradually, continuously varying visual setting.

13. The vibration-function-equipped control input system according to claim 7, wherein the predetermined reference point is the higher limit or the lower limit of the gradually varying value of the control object.

14. A vibration-function-equipped control input system comprising:
  a display panel operable to display a control screen;
  a touch panel disposed on the display panel, an area of the touch panel dedicated to a control key, the control key being displayed on the control screen and configured to adjust a setting of a control object controlled by pressing at least a portion of the area of the touch panel dedicated to the control key;
  a pressure-position detector operable to detect a position of the touch panel pressed;
  a position comparing section operable to determine if the pressed position of the touch panel is within a same area of the area of the touch panel dedicated to the control key;
  a vibration section operable to generate vibration to apply to the touch panel; and
  a controller operatively connected to the display panel, the touch panel, the pressure-position detector, the position comparing section, and the vibration section, wherein
  when the position comparing section determines that the pressed position of the touch panel is within the area of the touch panel dedicated to the control key, a timer starts measuring a time elapsed during which the pressed position of the touch panel (1) remains within the area of the touch panel dedicated to the control key and (2) has been continuously pressed, and
  the controller directs the vibration section to generate a first vibration pattern at the area of the touch panel dedicated to the control key when the time elapsed during which the pressed position of the touch panel (a) remains within the area of the touch panel dedicated to the control key and (b) has been continuously pressed reaches a predetermined time to confirm entry of a long key press, and subsequently directs the vibration section to generate a second vibration pattern at the area of the touch panel dedicated to the control key when a setting of the control object controlled by pressing at least a portion of the area of the touch panel dedicated to the control key has reached a predefined value.

15. The vibration-function-equipped control input system according to claim 14, wherein the second vibration pattern varies every time the setting of the control object varies.

16. The vibration-function-equipped control input system according to claim 15, wherein the setting of the control object controls field intensity associated with reception of broadcasting.

17. The vibration-function-equipped control input system according to claim 14, wherein the setting of the control object controls field intensity associated with reception of broadcasting.

18. The vibration-function-equipped control input system according to claim 17, wherein the control object is field intensity associated with receiving FM broadcasting.

19. The vibration-function-equipped control input system according to claim 17, wherein the control object is field intensity associated with receiving AM broadcasting.

20. The vibration-function-equipped control input system according to claim 17, wherein the control object is field intensity associated with receiving TV broadcasting.

* * * * *

UNITED STATES PATENT AND TRADEMARK OFFICE
CERTIFICATE OF CORRECTION

PATENT NO. : 7,639,239 B2
APPLICATION NO. : 11/291084
DATED : December 29, 2009
INVENTOR(S) : Kajimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 916 days.

Signed and Sealed this

Ninth Day of November, 2010

David J. Kappos
*Director of the United States Patent and Trademark Office*